United States Patent
Zhang et al.

(10) Patent No.: US 10,904,943 B2
(45) Date of Patent: Jan. 26, 2021

(54) TIME DISCONTINUOUS TRANSMISSION FOR NARROW BAND INTERNET OF THINGS

(71) Applicant: NOKIA TECHNOLOGIES OY, Espoo (FI)

(72) Inventors: Yuantao Zhang, Beijing (CN); Chunhai Yao, Beijing (CN); Yanji Zhang, Beijing (CN); Rapeepat Ratasuk, Hoffman Estates, IL (US); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/066,094

(22) PCT Filed: Jan. 7, 2016

(86) PCT No.: PCT/CN2016/070426
§ 371 (c)(1),
(2) Date: Jun. 26, 2018

(87) PCT Pub. No.: WO2017/117791
PCT Pub. Date: Jul. 13, 2017

(65) Prior Publication Data
US 2019/0021131 A1 Jan. 17, 2019

(51) Int. Cl.
*H04W 76/28* (2018.01)
*H04L 5/00* (2006.01)
(Continued)

(52) U.S. Cl.
CPC .............. *H04W 76/28* (2018.02); *H04L 1/08* (2013.01); *H04L 5/003* (2013.01); *H04L 5/0044* (2013.01);
(Continued)

(58) Field of Classification Search
CPC ..... H04W 76/28; H04W 4/70; H04W 72/042; H04W 72/046; H04W 84/18;
(Continued)

(56) References Cited

U.S. PATENT DOCUMENTS

| 9,084,238 B2 | 7/2015 | Gao et al. |
| 2005/0282494 A1* | 12/2005 | Kossi ............... H04W 88/06 455/41.2 |

(Continued)

FOREIGN PATENT DOCUMENTS

| CN | 102158325 A | 8/2011 |
| CN | 102905373 A | 1/2013 |

(Continued)

OTHER PUBLICATIONS

Japanese Office Action, Notification of Ground of Rejection application No. 2018-530491 dated Mar. 13, 2019.
(Continued)

*Primary Examiner* — Hardikkumar D Patel
(74) *Attorney, Agent, or Firm* — Squire Patton Boggs (US) LLP

(57) ABSTRACT

Various communication systems may benefit from time discontinuous transmission. For example, narrow band Internet of things (NB-IoT) may benefit from having transmissions with sufficient time diversity to avoid unnecessary repetition. A method can include configuring a control channel and data channel partitioning pattern within a configured time period. The method can additionally include communicating with at least one user equipment based on the control channel and data channel partitioning pattern.

16 Claims, 10 Drawing Sheets

(51) Int. Cl.
*H04W 4/70* (2018.01)
*H04L 1/08* (2006.01)
*H04W 72/04* (2009.01)
*H04L 1/18* (2006.01)
*H04L 1/00* (2006.01)

(52) U.S. Cl.
CPC .......... *H04L 5/0053* (2013.01); *H04L 5/0094* (2013.01); *H04W 4/70* (2018.02); *H04W 72/042* (2013.01); *H04L 1/0083* (2013.01); *H04L 1/1822* (2013.01); *H04L 5/0005* (2013.01); *H04L 5/0012* (2013.01)

(58) Field of Classification Search
CPC ... H04W 72/04; H04W 72/044; H04W 24/10; H04W 88/06; H04W 28/14; H04W 72/1215; H04W 84/12; H04W 52/42; H04W 84/047; H04L 5/0044; H04L 5/0053; H04L 5/0005; H04L 1/08; H04L 5/003; H04L 5/0094; H04L 1/0083; H04L 1/1822; H04L 5/0012; H04L 5/0037; H04L 25/0226; H04L 5/0048; H04L 5/0023; H04L 5/0057; H04B 7/14; H04B 7/15; H04B 7/0413
See application file for complete search history.

(56) References Cited

U.S. PATENT DOCUMENTS

2011/0026473 A1  2/2011  Luo et al.
2012/0182895 A1* 7/2012  Jwa .................... H04W 72/046
                                                    370/252
2015/0029974 A1* 1/2015  Yamazaki ........... H04W 72/044
                                                    370/329
2015/0063370 A1  3/2015  Rouhana et al.

FOREIGN PATENT DOCUMENTS

EP           2822320 A1    1/2015
WO    WO 2009/084867 A1   7/2009
WO        2013/129506 A1    9/2013

OTHER PUBLICATIONS

International Search Report & Written Opinion dated Sep. 26, 2016 corresponding to International Patent Application No. PCT/CN2016/070426.
Japanese Office Action issued in corresponding Japanese Patent Application No. 2018-530491 dated Sep. 30, 2019.
Decision of Rejection issued in corresponding Japanese Patent Application No. 2018-530491, dated Mar. 23, 2020, with English translation thereof.
Thailand Office Action issued in corresponding Thailand Patent Application No. 1801003624 dated Nov. 26, 2019.
European Communication pursuant to Article 94(3) EPC, corresponding to EP 16 882 936.4, dated Jul. 15, 2020.
Indian Office Action corresponding to Indian Patent Application No. 201847029321, dated Jul. 22, 2020.
Supplemental European Search Report issued in corresponding European Patent Application No. 16882936.4-1219 dated Aug. 1, 2019.
European Communication pursuant to Article 94(3) EPC, corresponding to European Patent Application No. 16 882 936.4, dated Nov. 3, 2020.

* cited by examiner

TIME DISCONTINUOUS TRANSMISSION FOR NARROW BAND INTERNET OF THINGS

BACKGROUND

Field

Various communication systems may benefit from time discontinuous transmission. For example, narrow band Internet of things (NB-IoT) may benefit from having transmissions with sufficient time diversity to avoid unnecessary repetition.

Description of the Related Art

Narrow band Internet of things (NB-IoT) may need to operate in at least three scenarios: stand-alone operation utilizing for example the spectrum currently being used by GERAN systems as a replacement of one or more GSM carriers; guard band operation utilizing the unused resource blocks within a LIE carrier's guard-band; and in-band operation utilizing resource blocks within a normal LTE carrier.

NB-IoT may support up to 20 dB coverage improvement, massive number of low throughput devices, low delay sensitivity, ultra-low device cost, low device power consumption and (optimized) network structure.

In NB-IoT uplink (UL), single-tone transmissions may be supported. Two numerologies may be configurable for single-tone transmission: 3.75 kHz and 15 kHz. A cyclic prefix may be inserted and there may be frequency domain Sine pulse shaping in the physical layer.

Multi-tone transmissions may also be supported. The multi-tone transmissions may be based on SC-FDMA. The multi-tone transmissions may have 15 kHz UL subcarrier spacing. The UE may indicate the support of single-tone and/or multi-tone.

FIG. 1 illustrates subcarrier spacing and channel bandwidth of downlink NB-IoT. Downlink transmission may be with 15 kHz subcarrier spacing for all the scenarios: standalone, guardband, and in-band. Thus, downlink transmission may, as shown in FIG. 1, occupy only one LTE PRB, namely 180 kHz of transmission bandwidth.

NB-IoT may support operation with more than one downlink (DL) transmission (Tx) antenna port. For operation with two DL Tx antenna ports, NB-IoT may use SFBC.

SUMMARY

According to certain embodiments, a method can include configuring a control channel and data channel partitioning pattern within a configured time period. The method can additionally include communicating with at least one user equipment based on the control channel and data channel partitioning pattern. The control channel can include at least one control region. The data channel can include at least one data region. The at least one control/data region can include at least one subframe in time domain.

In certain embodiments, a method can include receiving a control channel and data channel partitioning pattern within a configured time period. The method can additionally include communicating with an access node based on the control channel and data channel partitioning pattern. The control channel can include at least one control region. The data channel can include at least one data region. The at least one control/data region can include at least one subframe in time domain.

An apparatus, according to certain embodiments, can include means for performing any of the above-described methods.

An apparatus, in certain embodiments, can include at least one processor and at least one memory including computer program code. The at least one memory and the computer program code can be configured to, with the at least one processor, cause the apparatus at least to perform any of the above-described methods.

A computer program product, according to certain embodiments, can encode instructions for performing any of the above-described methods.

A non-transitory computer-readable medium, in certain embodiments, can be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1:
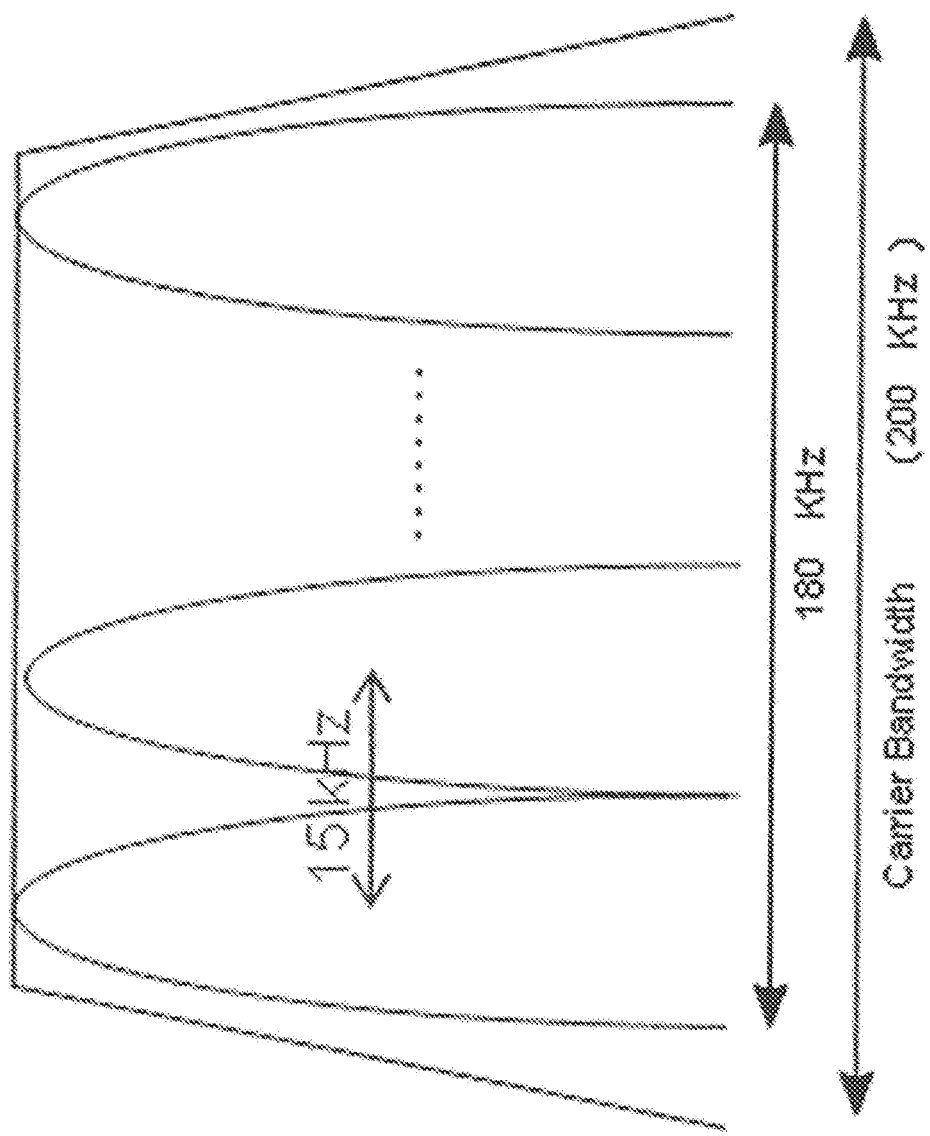
FIG. 1 illustrates subcarrier spacing and channel bandwidth of downlink NB-IoT.

Due to only one physical resource block (PRB) being accessible by each specific NB-IoT UE per each subframe, a large number of repetitions may be needed for coverage enhanced NB-IoT UEs. Reduction of the number of repetitions may reduce power consumption of detection in UE side. Also, a large number of repetition also produces a very high blocking rate, since all resource are occupied by only one specific UE during the repetition, while other UEs do unnecessary NB-PDCCH detection during such repetition. These repetitions and unnecessary detection may increase power consumption on the UE side. Certain embodiments may, therefore, help to reduce the number of repetitions.

Because only one PRB may be used for control and data transmission, there may be little frequency diversity gain that can be obtained by the UE, some possibilities existing only in in-band deployment. Besides, if only a maximum of two antenna ports are supported and SFBC is used as the only transmission scheme, the NB-IoT UEs may not have any precoding gain. Therefore, certain embodiments may introduce more diversity gain during the transmission to a reduced number of repetitions.

More particularly, certain embodiments may provide a time discontinuous transmission scheme for a UE to harvest time domain diversity gain. Such a scheme may reduce the number of repetitions. Moreover, certain embodiments may help to reduce the total transmission time and correspondingly reduce the detection time. Certain embodiments may provide a cell specific and a UE specific control channel and data channel partitioning pattern within each time period. The starting position and the length of the period may be configurable.

The cell specific partitioning pattern can be indicated to a UE through broadcasting signaling, such as in system information block (SIB) or in master information block (MIB). There may be multiple control regions and multiple data regions defined within each period, the size of each could be the same as or different from one another. Each control region can be served for scheduling different coverage enhancement (CE) mode UEs, or scheduling UEs with different set of C-RNTIs.

The UE specific partitioning pattern may be deduced from cell specific partitioning pattern and from signaling, for example UE specific radio resource control (RRC) signaling, from an access node, such as evolved node B (eNB), as to which control region it needs to camp on. If time division multiplexing (TDM) is used for multiplexing the control and data, the control region in each period may happen in the beginning of the period, and the UE may consider all the rest of regions, including other control regions, as possible data regions. This may permit the access node, such as an eNB, to transmit data in other control regions when there is not any control information transmitted in such regions. Each data region within each period is uniquely numbered so that the eNB or other access node can schedule DL data transmission in any data region(s).

Figure 2A:
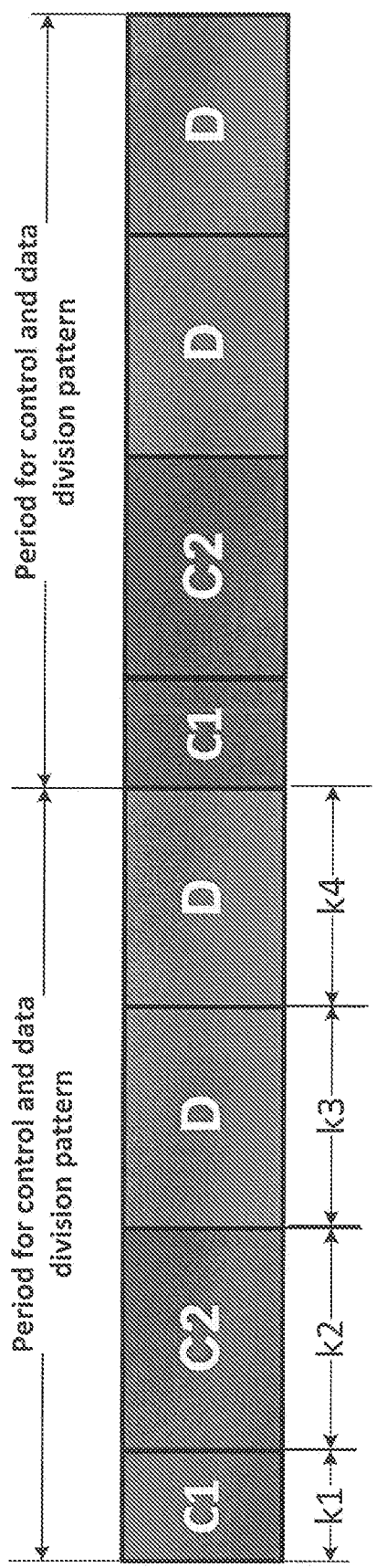
FIG. 2A illustrates an example of a cell specific partitioning pattern and UE specific partitioning pattern, according to certain embodiments.

FIG. 2A illustrates an example of a cell specific partitioning pattern and UE specific partitioning pattern, according to certain embodiments. In the cell specific partitioning pattern in FIG. 2A, in each period there are two control regions C1 and C2 with size k1 and k2 respectively, and two data regions with size k3 and k4 respectively.

Figure 2B:
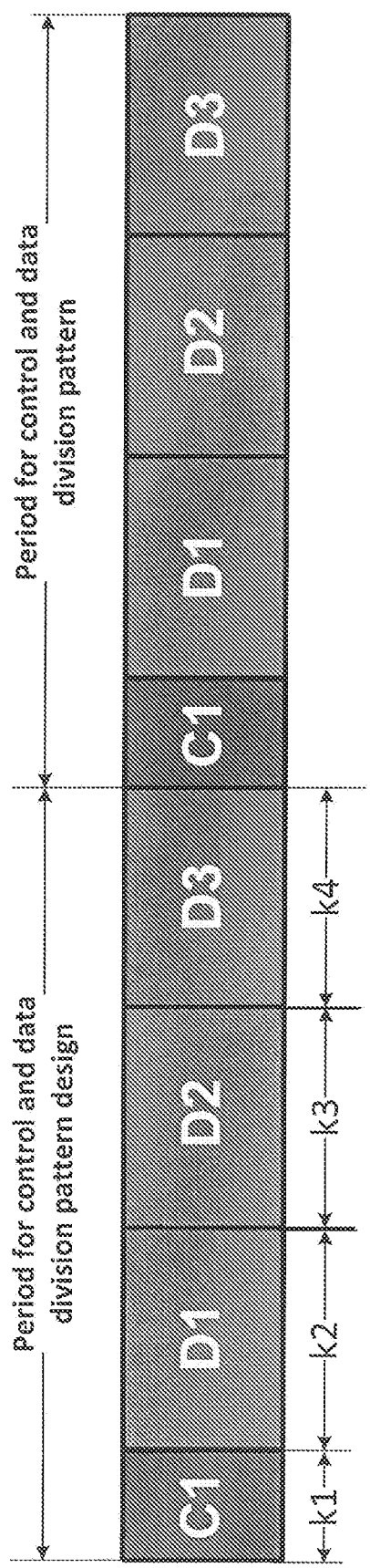
FIG. 2B illustrates another example of a cell specific partitioning pattern and UE specific partitioning pattern, according to certain embodiments.

FIG. 2B illustrates another example of a cell specific partitioning pattern and UE specific partitioning pattern, according to certain embodiments. In the UE specific partitioning pattern in FIG. 2B, the UE is camped in C1 as the control region and the data regions are numbered D1, D2, and D3. In this example, C1 has size k1, whereas D1, D2, and D3 have size k2, k3, and k4 respectively.

Figure 2C:
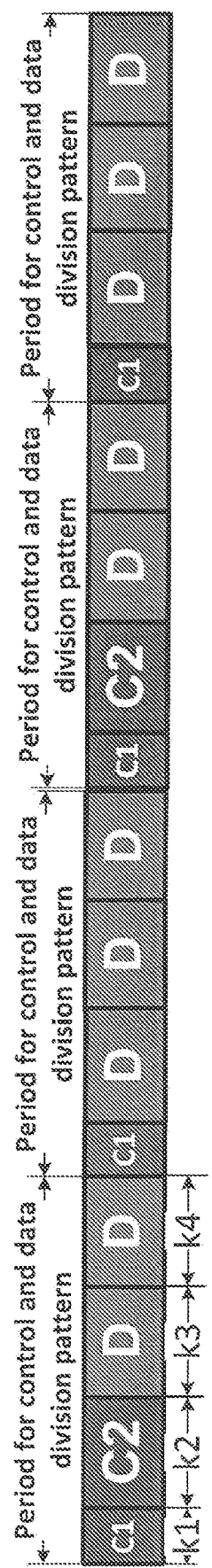
FIG. 2C illustrates user equipment specific control channel and data channel partitioning pattern with different time granularities, according to certain embodiments.

Additionally, the control areas may be multiplexed with different time granularities. For example, FIG. 2C illustrates user equipment specific control channel and data channel partitioning pattern with different time granularities, according to certain embodiments. In this case some of the cell specific control channel allocations may be transmitted with different periodicities, fitting the UEs which are requiring different amount of repetitions. For example, the first period may resemble the example of FIG. 2A, whereas a second period may resemble the example of FIG. 2B.

For coverage enhancement (CE) mode UEs with medium to large repetition level, there may be multiple scheduling granularity in time domain within each period. Taking the example in FIG. 2B, the available scheduling granularity could be {D1}, {D1, D2}, {D1, D2, D3}, {D2}, {D2, D3}, {D3}. The scheduling granularity can be indicated in the downlink control information (DCI) using 3 bits or can be radio resource control (RRC) configured.

Figure 3:
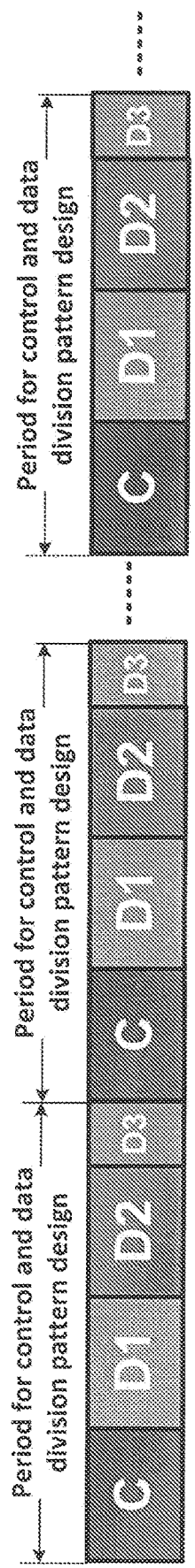
FIG. 3 illustrates repetition of a data channel for user equipment with medium to high repetition level, according to certain embodiments.

FIG. 3 illustrates repetition of a data channel for user equipment with medium to high repetition level, according to certain embodiments. In case of repetition, the access node, for example eNB, may only transmit the scheduled data region in each period. Therefore, if for example {D2} is scheduled (as illustrated in FIG. 3), the repetition may happen in each {D2} in each period until the end of repetition. This may enable the UE to obtain time diversity gain during the repeated transmission. Besides, if {D1, D2, D3} is scheduled, the eNB can finish the transmission using minimum time. Thus, transmission latency may be reduced. The repetition level in the scheduling DCI can take the size of {D2} as the unit, and can indicate the number of repeated units.

Figure 4A:
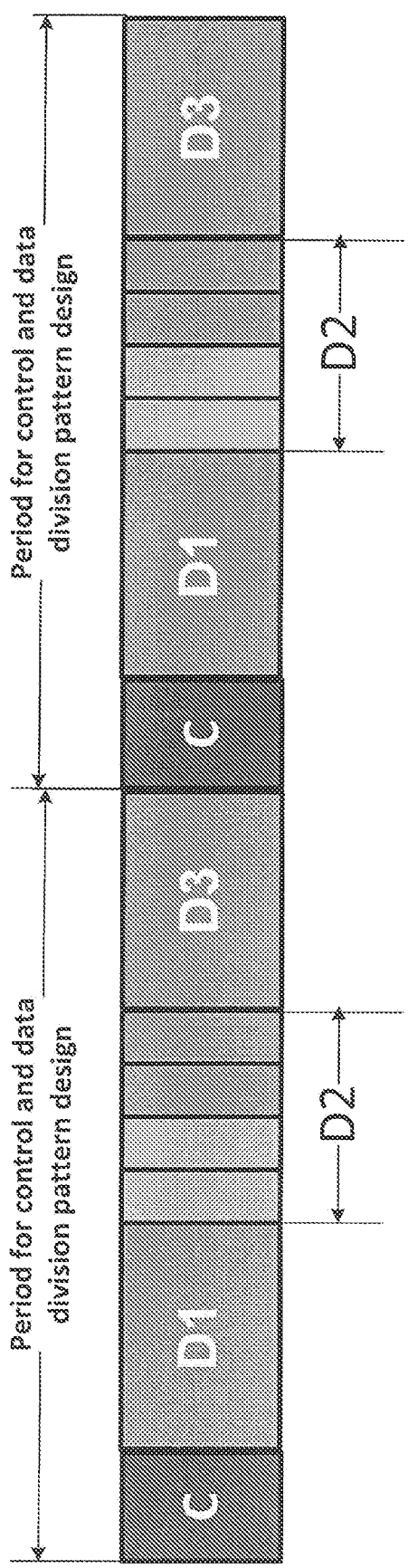
FIG. 4A illustrates transmission for user equipment with a low repetition level, according to certain embodiments.

FIG. 4A illustrates transmission for user equipment with a low repetition level, according to certain embodiments. For CE mode UEs without repetition or with a small repetition level, certain embodiments may introduce finer scheduling granularity in order to have time diversity gain. The UE can be indicated with a data region index, similar to that for medium to high repetition level UEs, and can be indicated with the allocated PRBs within the allocated region.

FIG. 4A gives one example, where the UE is indicated with {D2} and the 4 PRBs or subframes within {D2}. These 4 PRBs can be divided into two groups of 2 PRBs each, as shown. These two kinds of indication can be in the same DCI and related to different item, or alternatively the first indication can be indicated through higher layer signaling and the second indication can be indicated through physical layer signaling. The repetition level in the scheduling DCI can take these 2 or 4 PRBs as the unit, and can indicate the number of repeated units.

Alternatively, the eNB can define valid subframes for PDSCH discontinuous transmission. These subframes can become invalid subframes for UE using continuous transmission. The valid subframes can be for example a data region in each period, or the eNB signal a pattern within a new period through a bitmap.

PDCCH scheduling can be the same for both discontinuous and continuous transmissions. The eNB can indicate in DCI whether transmission is continuous or discontinuous.

The transmission of PDCCH and PDSCH may be done in a periodic or aperiodic way. In periodic transmission the UE may expect the data or control channel at periodic locations in time, locations which can be continuous or discontinuous. In aperiodic transmission the transmission instances may be signaled to the UE according to a bitmap.

If DCI indicates continuous transmission (Tx), it may only be sent on valid subframes for continuous Tx. Likewise for discontinuous Tx. A UE can postpone Tx when it encounters invalid subframe types.

Another alternative is that no predefined pattern is introduced but repetition is transmitted using a timing which is fixed or configured by eNB, for example using the timing for HARQ retransmission instead. For example, if the number of subframes is 4, instead of 4 continuous subframes, a 1st subframe can be sent at x, a 2nd subframe can sent at x+N, where x+N would be the subframe that would be used for retransmission, as if the 1st subframe has been NACKed. Because the process is half-duplex, even though there is only one HARQ process, there may still be enough gap between HARQ transmissions to provide time diversity.

The above embodiment may always take full REs within the PRB in each subframe as the minimum unit, or may take full or partial REs within the PRB as the minimum unit based on eNB configuration. Alternatively, the control channel may always take full REs within the period, while data channel can take full or partial REs with the PRB as the minimum unit.

Figure 4B:
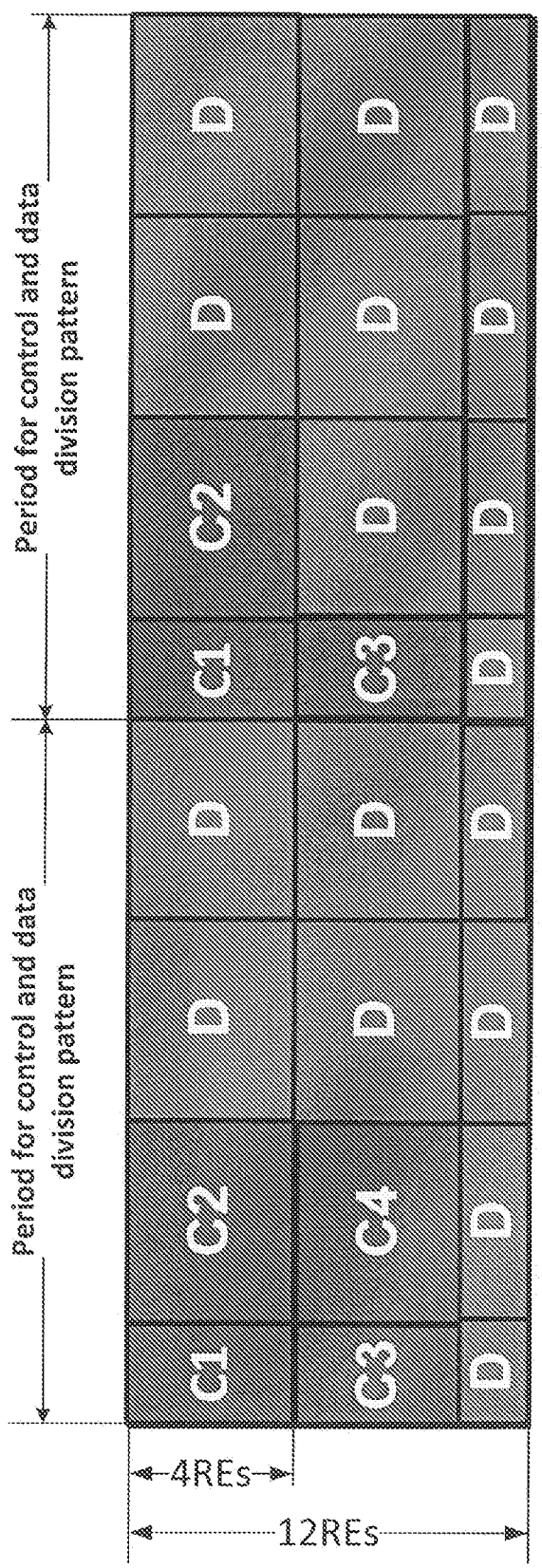
FIG. 4B provides an example of four resource elements as a minimum unit, according to certain embodiments.

FIG. 4B provides an example of four resource elements as a minimum unit, according to certain embodiments. More specifically, FIG. 4B gives one example of 4 REs, out of 12 REs per PRB, as the minimum unit for cell specific control and data channel partitioning.

Figure 4C:
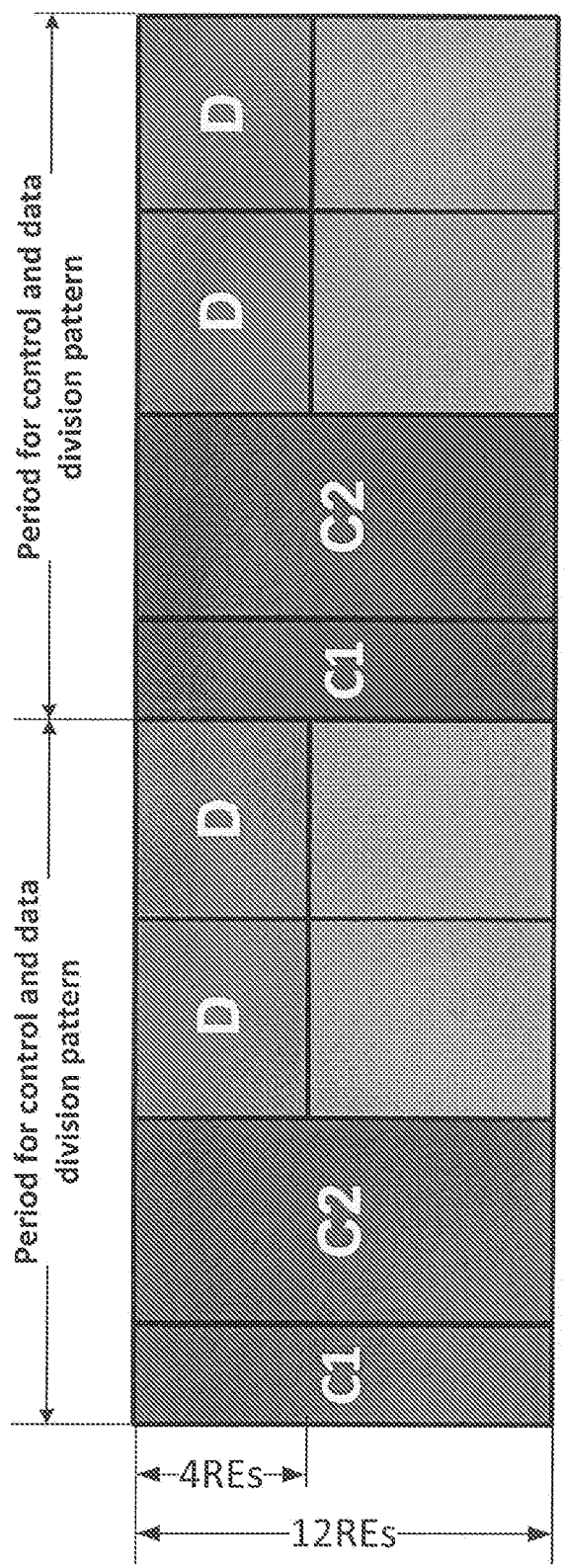
FIG. 4C provides another example of how resource elements can be used for control and data channels, according to certain embodiments.

FIG. 4C provides another example of how resource elements can be used for control and data channels, according to certain embodiments. More particularly, FIG. 4C gives another example of full REs for control channels and 4 REs for data channels. In such a partial PRB transmission, multiple control and data channels may be multiplexed in time and frequency allowing for both time and frequency diversity. Frequency hopping may be allowed inside one PRB.

The above embodiments may be variously implemented. For example, the operation of an access node, such as an eNB, may be as follows. The eNB may configure any, a combination, or all of the following through either higher layer signaling or physical layer signaling: the starting subframe and the size of the period for a time period, within each of a defined cell specific control channel and data channel pattern; the number of control region(s) and the number of data region(s) within each period, as well as the size of each region; the periodicity of each control region; a control region that the UE is supposed to camp on; the scheduled data region(s) in each period; the scheduled PRBs in the scheduled data region; and the number of repetitions for the scheduled data region(s) or the scheduled PRBs within the scheduled region.

Alternatively, or in addition, the eNB or other access node can indicate one or more of the following: a valid subframe pattern for discontinuous transmission; and whether the scheduled transmission is continuous or discontinuous.

The above configuration, indication and definition can always take full REs within the PRB in each subframe as the minimum unit, or take full or partial REs within the PRB as the minimum unit based on eNB configuration, or take full REs as the minimum unit for control channel while data channel takes full or partial REs as the minimum unit. Other permutations or combinations of these approaches are permitted.

The UE may operate based on the access node operation. For example, the UE may follow a configuration from eNB and may decide the UE specific control and data partitioning pattern. Then UE may detect NB-PDCCH in the control region in each period and detect NB-PDSCH in the scheduled resources.

Figure 5:
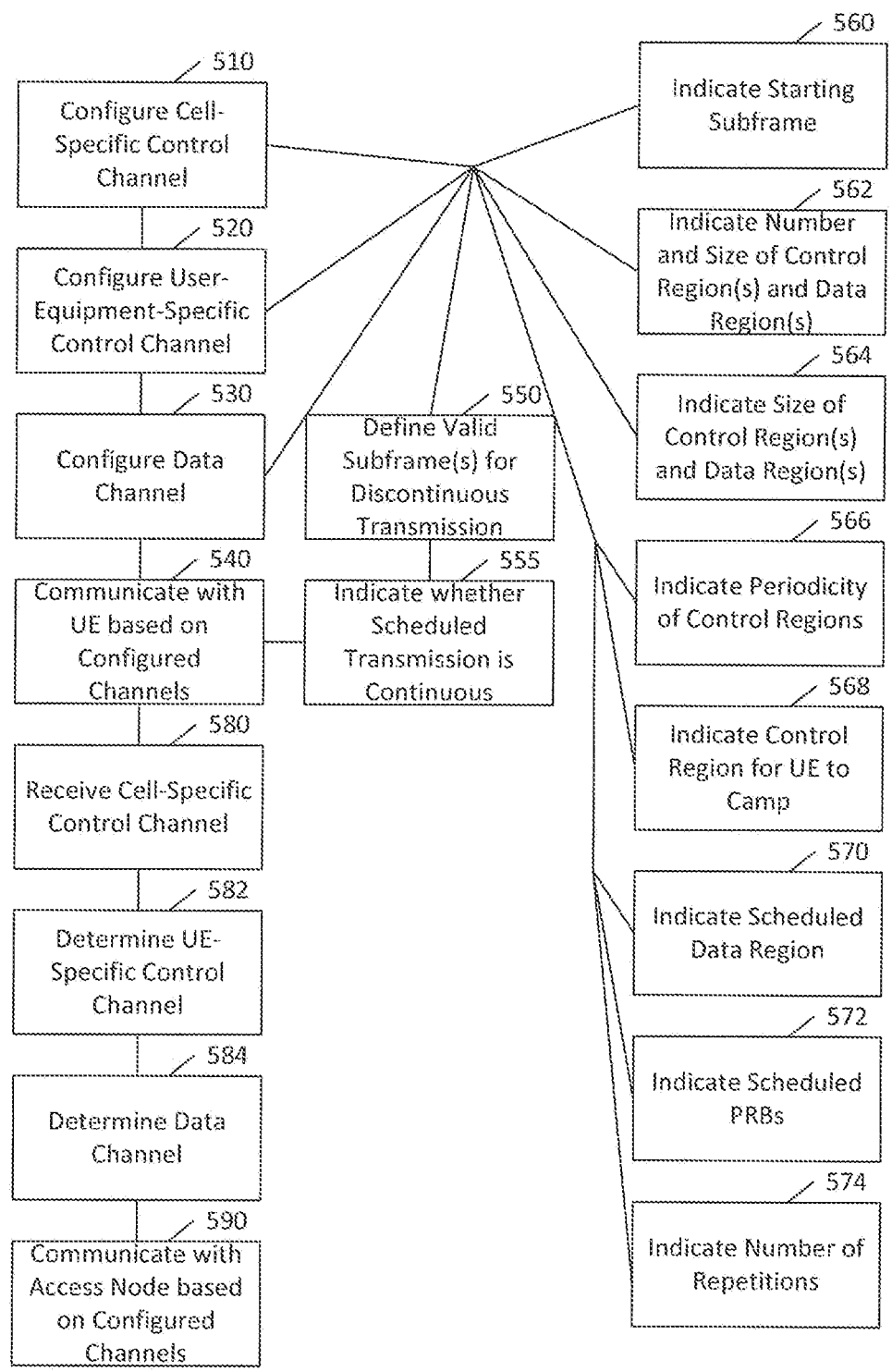
FIG. 5 illustrates a method according to certain embodiments.

FIG. 5 illustrates a method according to certain embodiments. As shown in FIG. 5, a method can include, at 510, configuring a cell-specific control channel partitioning pattern with a time period. The method can also include, at 520, configuring a user-equipment-specific control channel partitioning pattern within the time period. The method can further include, at 530, configuring a data channel partitioning pattern within the time period. The data channel partitioning pattern configuration is illustrated separately, but can be performed as part of the cell-specific configuration and as part of the user-equipment-specific configuration along with the control channel partitioning pattern configuration.

The configuring at 510, 520, and 530 may thus include configuring a control channel and data channel partitioning pattern within a configured time period. In certain embodiments the partitioning pattern may be cell-specific, user-equipment-specific, or both.

The method can additionally include, at 540, communicating with at least one user equipment based on the control channel and data channel partitioning pattern, for example, the cell-specific control channel partitioning pattern, the user-equipment-specific control channel partitioning pattern, and/or the data channel partitioning pattern.

A starting position of the time period can be configurable and a length of the time period can also be configurable. The configured channel arrangements can be made according to a wide variety of options, including those shown in FIGS. 2A, 2B, 2C, 3, 4A, 4B, and 4C. The control channel can include at least one control region, the data channel can include at least one data region, and the at least one control/data region can include at least one subframe in the time domain.

The configuring of the cell-specific control channel partitioning pattern, the user-equipment-specific control channel partitioning pattern, or the data channel partitioning pattern can be performed by physical layer signaling or by higher layer signaling.

The cell-specific control channel partitioning pattern can be signaled to the user equipment using a system information block or master information block or any other broadcast mechanism.

The user-equipment-specific control channel partitioning pattern can be deducible from the cell-specific control channel partitioning pattern and from a further indication signaled from an access node, such as an eNB, as described above.

The configuring of at least one of the cell-specific control channel partitioning pattern, the user-equipment-specific control channel partitioning pattern, or the data channel partitioning pattern can include, at 550, defining at least one valid subframe for physical downlink scheduling channel discontinuous transmission. Additionally, as noted above, the method can further include, at 555, indicating whether a scheduled transmission is continuous or discontinuous.

The method can additionally include, at 560, indicating a starting subframe as the starting position. The method can further include, at 562, indicating a number of control regions and a number of data regions within the time period. The method can additionally include, at 564, indicating a size of each of the control regions and data regions. The method can also include, at 566, indicating a periodicity of the control regions.

The method can further include, at 568, indicating a control region of the time period on which the user equipment is to camp. The method additionally include, at 570, indicating at least one scheduled data region in the period. Furthermore, at 572, the method can include indicating scheduled physical resource blocks in the scheduled data region. The method can also include, at 574, indicating a number of repetitions for the at least one scheduled data region or scheduled physical resource blocks within the at least one scheduled data region.

The above described features of FIG. 5 may be steps or functions that are performed by an access node, such as an eNB, as described above. The following features may be performed by a user equipment. For each of the indicated aspects of the configuration, such as those at 560 to 574, there may be a reciprocal step of receiving and processing such an indication in the user equipment. Those reciprocal steps are omitted simply for simplicity and ease of illustration. Likewise, there may be steps of identifying that a frame is valid for discontinuous transmission and determining whether a scheduled transmission is continuous or discontinuous, in response to steps 550 and 555, if such an alternative is employed as a way of configuring the various data and/or control channels.

As shown in FIG. 5, at 580, the method may include receiving a cell-specific control channel partitioning pattern with a time period. The method may also include, at 582, determining a user-equipment-specific control channel partitioning pattern within the time period. The method may further include, at 584, determining a data channel partitioning pattern within the time period. These determinations may be made based on explicit or implicit signaling from the access node.

The method may additionally include, at 590, communicating with an access node based on the cell-specific control channel partitioning pattern, the user-equipment-specific control channel partitioning pattern, and the data channel partitioning pattern. As mentioned above, the starting position of the time period may be configurable, as may be the length of the time period.

Figure 6:
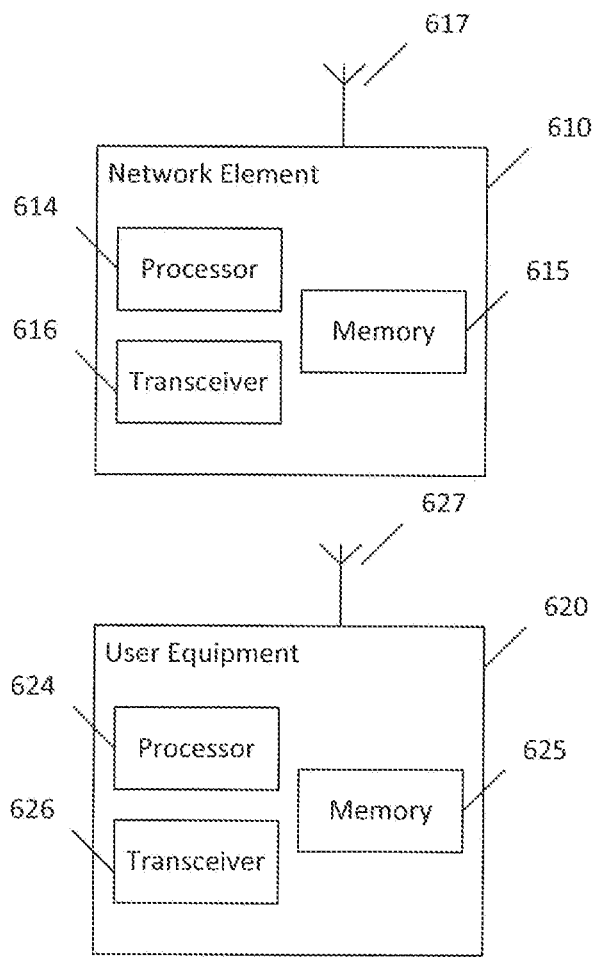
FIG. 6 illustrates a system according to certain embodiments.

FIG. 6 illustrates a system according to certain embodiments of the invention. It should be understood that each block of the flowchart of FIG. 5 may be implemented by various means or their combinations, such as hardware, software, firmware, one or more processors and/or circuitry. In one embodiment, a system may include several devices, such as, for example, network element 610 and user equipment (UE) or user device 620. The system may include more than one UE 620 and more than one network element 610, although only one of each is shown for the purposes of illustration. A network element can be an access point, a base station, an eNode B (eNB), or any other network element. Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIG. 5.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIG. 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Various embodiments may have benefits and/or advantages. For example, the designed time continuous transmission can give the UE time diversity gain so that the total number of repetitions can be reduced. Also, certain embodiments can achieve flexible resource allocation according to the load of NB-IoT traffic.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP: 3rd generation partnership project
LTE: Long term evolution
MTC: Machine type communication
NB-IoT: Narrow band—internet of things
CE: Coverage enhanced
SFBC: Space frequency block code
eNB: enhanced Node-B
UE: User equipment
DL: Downlink
UL: Uplink
RRC: Radio resource control
PRB: Physical resource block
PDSCH: Physical downlink sharing channel
NB-PDSCH: Narrow band PDSCH
DCI: Downlink control information
PDCCH: Physical downlink control channel
NB-PDCCH: Narrow band PDCCH

What is claimed is:

1. An apparatus, comprising:
   at last one processor, and
   at last one memory including computer program code,
   wherein the at last one memory and the computer program code are configured to, with the at last one processor, cause the apparatus at last to perform:
   configuring a control channel partitioning pattern within a configured time period, wherein a starting position of the time period is configurable, and wherein a length of the time period is configurable; and
   communicating with at last on user equipment based on the control channel partitioning pattern, wherein a control channel comprises at last on control region defined by the control channel partitioning pattern for the at last on user equipment to camp on, and the at last on control region comprises at last one subframe in time domain,
   wherein the control channel partitioning pattern comprises a cell-specific channel partitioning pattern, and
   wherein the control channel partitioning pattern further comprises a user-equipment-specific control channel partitioning pattern.

2. The apparatus of claim 1, wherein the at last one memory and the computer program code are further configured to, with the at last on processor, cause the apparatus to:
   indicate a starting subframe as the starting position.

3. The apparatus of claim 1, wherein the configuring of at last one of the cell-specific channel partitioning pattern or the user-equipment-specific channel partitioning pattern is performed by physical layer signaling or higher layer signaling.

4. The apparatus of claim 1, wherein the cell-specific channel partitioning pattern is signaled to the user equipment using a system information block or master information block.

5. The apparatus of claim 1, wherein the user-equipment-specific channel partitioning pattern is deducible from the cell-specific channel partitioning pattern and from a further indication signaled to the user equipment.

6. The apparatus of claim 1, wherein the configuring of at last on of the cell-specific channel partitioning pattern or the user-equipment-specific channel partitioning pattern comprises defining at last one valid subframe for physical downlink scheduling channel discontinuous transmission.

7. The apparatus of claim 6, wherein the at least one memory and the computer program code are further configured to, with the at last on processor, cause the apparatus to indicate whether a scheduled transmission is continuous or discontinuous.

8. The apparatus of claim 1, wherein the at last on memory and the computer program code are further configured to, with the at last on processor, cause the apparatus to indicate a periodicity of the camped control region.

9. The apparatus of claim 1, wherein a minimum unit of the user-equipment-specific channel partitioning pattern or the cell-specific channel partitioning pattern is always a full resource element within a physical resource block in each subframe, or is configurable by an access node to be full or partial resource elements.

10. The apparatus of claim 1, wherein the at last one memory and the computer program code are further configured to, with the at last one processor, cause the apparatus at last to:
    configure a data channel partitioning pattern within the configured time period.

11. An apparatus, comprising:
    at least one processor, and
    at least on memory including computer program code,
    wherein the at last on memory and the computer program code are configured to, with the at last one processor, cause the apparatus at least to perform:
    receiving a control channel partitioning pattern within a configured time period, wherein a starting position of the time period is configurable, and wherein a length of the time period is configurable; and
    communicating with an access node based on the control channel partitioning pattern,
    wherein a control channel comprises at last one control region defined by the control channel partitioning pattern for the apparatus to camp on, and the at least one control region comprises at last one subframe in time domain, and
    wherein the control channel partitioning pattern comprises a cell-specific channel partitioning pattern, and
    wherein the control channel partitioning pattern further comprises a user-equipment-specific control channel partitioning pattern.

12. The apparatus of claim 11, wherein the at last one memory and the computer program code are further configured to, with the at last on processor, cause the apparatus at last to:
    receive a data channel partitioning pattern within the configured time period.

13. A method, comprising:
configuring a control channel partitioning pattern within a configured time period, wherein a starting position of the time period is configurable, and wherein a length of the time period is configurable; and
communicating with at last on user equipment based on the control channel partitioning pattern, wherein a control channel comprises at last on control region defined by the control channel partitioning pattern for the at last on user equipment to camp on, and the at last on control region comprises at last one subframe in time domain,
wherein the control channel partitioning pattern comprises a cell-specific channel partitioning pattern, and
wherein the control channel partitioning pattern further comprises a user-equipment-specific control channel partitioning pattern.

14. The method of claim 13, further comprising indicating a starting subframe as the starting position.

15. The method of chain 13, wherein the configuring of at least one of the cell-specific channel partitioning pattern or the user-equipment-specific channel partitioning pattern is performed by physical layer signaling or higher layer signaling.

16. The method of claim 13, wherein the cell-specific channel partitioning pattern is signaled to the user equipment using a system information block or master information block.

\* \* \* \* \*

UNITED STATES PATENT AND TRADEMARK OFFICE
CERTIFICATE OF CORRECTION

PATENT NO. : 10,904,943 B2
APPLICATION NO. : 16/066094
DATED : January 26, 2021
INVENTOR(S) : Yuantao Zhang et al.

It is certified that error appears in the above-identified patent and that said Letters Patent is hereby corrected as shown below:

In the Claims

Claim 1, Column 9, Line 43:
Please change "last" to --least--

Claim 1, Column 9, Line 44:
Please change "last" to --least--

Claim 1, Column 9, Line 45:
Please change "last" to --least--

Claim 1, Column 9, Line 46:
Please change "last" to --least--

Claim 1, Column 9, Line 47:
Please change "last" to --least--

Claim 1, Column 9, Line 52:
Please change "last on" to --least one--

Claim 1, Column 9, Line 54:
Please change "last on" to --least one--

Claim 1, Column 9, Line 56:
Please change "last on user equipment to camp on, and the at last" to --least one user equipment to camp on, and the at least--

Claim 1, Column 9, Line 57:
Please change "on control region comprises at last" to --one control region comprises at least--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

Claim 1, Column 9, Line 60:
Please change "cell-specific channel" to --cell-specific control channel--

Claim 2, Column 9, Line 64:
Please change "last" to --least--

Claim 2, Column 9, Line 66:
Please change "last on" to --least one--

Claim 3, Column 10, Line 2:
Please change "last one of the cell-specific channel" to --least one of the cell-specific control channel--

Claim 3, Column 10, Line 3:
Please change "user-equipment-specific channel" to --user-equipment-specific control channel--

Claim 4, Column 10, Line 7:
Please change "channel" to --control channel--

Claim 5, Column 10, Line 11:
Please change "specific channel" to --specific control channel--

Claim 5, Column 10, Line 12:
Please change "cell-specific channel" to --cell-specific control channel--

Claim 6, Column 10, Line 15:
Please change "last on of the cell-specfic channel" to --least one of the cell-specific control channel--

Claim 6, Column 10, Line 16:
Please change "user-equipment-specific channel" to --user-equipment-specific control channel--

Claim 6, Column 10, Line 17:
Please change "last" to --least--

Claim 7, Column 10, Line 21:
Please change "last on" to --least one--

Claim 8, Column 10, Line 24:
Please change "last on" to --least one--

Claim 8, Column 10, Line 26:
Please change "last on" to --least one--

Claim 9, Column 10, Line 29:
Please change "user-equipment-specific channel" to --user-equipment-specific control channel--

CERTIFICATE OF CORRECTION (continued)
U.S. Pat. No. 10,904,943 B2

Claim 9, Column 10, Line 30:
Please change "cell-specific channel" to --cell-specific control channel--

Claim 10, Column 10, Line 34:
Please change "last" to --least--

Claim 10, Column 10, Line 36:
Please change "last" to --least--

Claim 10, Column 10, Line 37:
Please change "last" to --least--

Claim 11, Column 10, Line 42:
Please change "on" to --one--

Claim 11, Column 10, Line 43:
Please change "last on" to --least one--

Claim 11, Column 10, Line 44:
Please change "last" to --least--

Claim 11, Column 10, Line 52:
Please change "last" to --least--

Claim 11, Column 10, Line 55:
Please change "last" to --least--

Claim 11, Column 10, Line 58:
Please change "cell-specific channel" to --cell-specific control channel--

Claim 12, Column 10, Line 62:
Please change "last" to --least--

Claim 12, Column 10, Line 64:
Please change "last on" to --least one--

Claim 12, Column 10, Line 65:
Please change "last" to --least--

Claim 13, Column 11, Line 6:
Please change "last on" to --least one--

Claim 13, Column 11, Line 8:
Please change "last on" to --least one--

CERTIFICATE OF CORRECTION (continued)
U.S. Pat. No. 10,904,943 B2

Claim 13, Column 11, Line 10:
Please change "the at last on user equipment to camp on, and the at last" to --the at least one user equipment to camp on, and the at least--

Claim 13, Column 11, Line 11:
Please change "on control region comprises at last" to --one control region comprises at least--

Claim 13, Column 10, Line 14:
Please change "cell-specific channel" to --cell-specific control channel--

Claim 15, Column 10, Line 21:
Please change "cell-specific channel" to --cell-specific control channel--

Claim 15, Column 11, Line 22:
Please change "user-equipment-specific channel" to --user-equipment-specific control channel--

Claim 16, Column 11, Line 26:
Please change "channel" to --control channel--